United States Patent [19]

Feinzig et al.

[11] Patent Number: 4,676,946
[45] Date of Patent: Jun. 30, 1987

[54] THERMAL INSULATING BLANKET

[75] Inventors: David S. Feinzig, Newton Centre; I. Wesley Watson, Hingham; Clifford H. Hahn, Lynnfield, all of Mass.

[73] Assignee: Eastern Refractories Company, Inc., Belmont, Mass.

[21] Appl. No.: 678,231

[22] Filed: Dec. 5, 1984

[51] Int. Cl.⁴ .............................. G21C 9/00; B32B 1/04
[52] U.S. Cl. ........................................ 376/289; 428/75; 428/247; 428/251
[58] Field of Search ..................... 376/289; 428/74, 75, 428/76, 247, 251; 138/149, 172; 220/DIG. 9

[56] References Cited

U.S. PATENT DOCUMENTS

| 4,169,754 | 10/1979 | Perrotta | 156/187 |
| 4,207,918 | 6/1980 | Burns et al. | 137/375 |
| 4,345,624 | 8/1982 | Rider | 138/110 |
| 4,442,585 | 4/1984 | McGeheo, Sr. et al. | 29/432 |

Primary Examiner—John F. Terapane
Assistant Examiner—Eric Jorgensen
Attorney, Agent, or Firm—Wolf, Greenfield & Sacks

[57] ABSTRACT

A thermal insulating blanket used for insulating pipes and equipment in nuclear power plant containment buildings is resistant to tearing if impinged upon by a high force liquid stream (i.e., during a loss of coolant accident—LOCA) and if torn is cut into small pieces which will not clog the protective screen of the emergency cooling system recirculating sump. The blanket consists of a filler layer of thermal insulating fibers, such as glass fiber wool or ceramic fiber wool, a waterproof sheet, and a wire mesh casing surrounding the filler layer and sheet. The wire casing dissipates the force of high force liquid streams which may strike the blanket during a LOCA and in the event that the filler layer is torn, the filler layer is cut into small pieces as it passes through the casing. Preferably, a wire mesh septum lies within the filler layer to assist in cutting up the torn filler layer.

23 Claims, 2 Drawing Figures

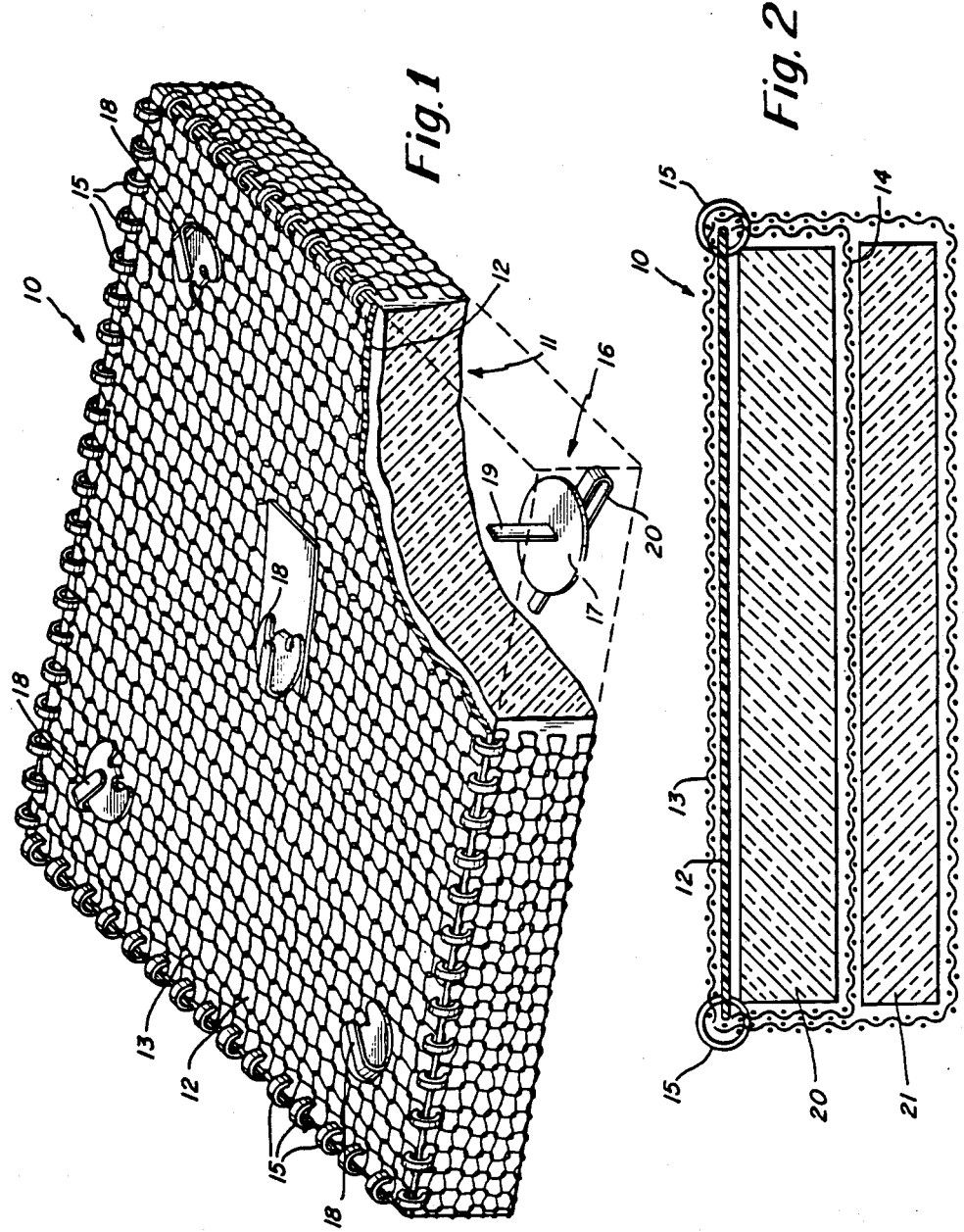

THERMAL INSULATING BLANKET

FIELD OF THE INVENTION

This invention relates to thermal insulating blankets and in particular to insulating blankets useful in containment buildings of nuclear power plants.

BACKGROUND OF THE INVENTION

First-generation nuclear power plants utilized metallic, reflective-type insulation for pipes and equipment located inside the containment buildings. It was found that this reflective insulation did not produce the promised reduction in heat loss and resulted in reduced efficiency and increased operating costs. Further, during maintenance shutdowns this fragile metal insulation was damaged by foot traffic and/or handling making it difficult or impossible to reinstall. Since each piece was custom-made, replacements could not be readily obtained during the scheduled shutdown period. In addition, this insulation did not lend itself to easy inspection of pipe welds, which must be performed at regular intervals.

As a result of these problems, nuclear power plants began to replace this metal insulation with removable blankets, particularly in areas where inspection of pipe welds was required. A potential problem arises, however, with use of blanket insulation during a loss of coolant accident (LOCA). During a LOCA, the blankets may be subjected to high energy liquid jets (i.e., subcooled liquid or steamwater mixtures at high pressure) which enter the containment area. If the jet stream impinges on the blankets, the fibrous blanket material may be torn lose generating debris which can clog the protective screen of the emergency core cooling system (ECCS) sump and thereby impair recirculation of water from the sump.

The first blanket system accepted by the United States Nuclear Regulatory Commission consists of a two-inch thick blanket of very light density glass fiber fillers totally encapsulated in a glass fiber cloth envelope. The blankets are used in either single or double layer construction depending upon the pipe temperature. The cloth envelopes are formed with sewn seams and, in the case of double layer construction, the seams in the two layers are staggered with respect to one another. Velcro fastenings are used to attach the blankets to the pipes and/or adjacent blankets. An outer jacket of 26-gauge (0.01875 inch thick) stainless steel, fastened by suitcase latches is sometimes used to protect the blankets. These fragile blankets are intended to be completely destroyed in the event of a LOCA with the hope that the residue from the blankets will be small enough so as not to block the sump screen and, if necessary, to pass through the recirculating pump.

Another known insulating blanket used in nuclear containment buildings consists of a glass fiber filler layer having a waterproof sheet of ERCO-SIL 36S (sold by Eastern Refractories Company, Inc., Belmont, Mass.) on its outer surface (i.e., disposed away from the pipe). The remaining sides of the filler layer are covered by glass fiber cloth. Metal clips consisting of stainless steel hog rings connect the cloth to the waterproof sheet. This design is much stronger than the first design and is intended to resist damage during a LOCA.

Other known insulating blankets used in nuclear containment buildings are described in Durgin, W. W., and Noreika, J. F., "The Susceptibility Of Fibrous Insulation Pillows To Debris Formation Under Exposure To Energetic Jet Flows," NUREG/CR-3710 (SAND 83-7008), Alden Research Laboratory and Sandia National Laboratory, U.S. Nuclear Regulatory Commission, Washington, D.C. 20555. A first blanket described therein consists of 16 lb/ft$^3$ mineral wool with a cover of asbestos cloth coated with one-half mil of Mylar (registered trademark of E. I. DuPont de Nemours & Co., Wilmington, Del.). A second consists of 11 lb/ft$^3$ needle packed fiberglass layers covered with stainless knitted mesh on one side (close to the pipe) and silicone glass cloth on the other (outer) side. A third consists of 11 lb/ft$^3$ needle packed fiberglass layers covered with 18 ounce fiberglass cloth. These three blankets were tested for damage and failure (loss of blanket material) under jet streams of up to 65 psi applied at an angle of 45° and 90°. The third blanket exhibited the greatest resistance to damage and failure.

In the field of thermal and acoustic insulation blankets for exhaust systems in gas transfer plants, oil rigs, refineries and the like, it has been suggested to provide an insulation blanket comprising a ceramic fiber core approximately one and one-half inches in thickness, a thin lead sheet adjacent the core for noise insulation, a thin stainless steel foil/fiberglass cloth laminate between the core and insulated object for excluding moisture, a silicone rubber coated fiberglass cloth completely surrounding the core and other layers, and a flexible stainless steel mesh stocking enveloping the entire assembly to provide additional protection (U.S. Pat. No. 4,442,585). These blankets are wrapped tightly around pipes by means of lacing anchors and second layers are provided around the joints to render the edges significantly impermeable to thermal and acoustic radiation.

SUMMARY OF THE INVENTION

It is an object of this invention to provide a thermal insulating blanket useful for insulating pipes and equipment inside the containment building of a nuclear power plant and which will resist damage during a loss of coolant accident (LOCA).

Another object is to provide an insulating blanket having an outer casing that will dissipate the force of a high force liquid stream striking the blanket so as to prevent the blanket from tearing.

A further object is to provide an insulating blanket which if torn during a LOCA will not clog the protective screen of the emergency coolant recirculating sump.

Another object is to provide an insulating blanket that will be cut into small pieces if torn by a high force liquid stream.

Another object is to provide removable and reusable, flexible blanket insulation for pipes and equipment.

According to this invention an insulating blanket is provided having an inner surface positionable adjacent the object to be insulated and an opposing outer surface. The blanket consists of a filler layer of thermal insulating fibers, a waterproof sheet covering one surface of the filler layer, and a wire mesh casing surrounding the filler layer and sheet to form the blanket. The waterproof sheet is positioned between the outer surface of the blanket and the filler layer. The wire mesh casing serves to dissipate high force liquid jet streams which may strike the outer surface of the blanket during a LOCA. Further, if the jet stream tears the blanket, the wire mesh serves to cut up the filler layer as it passes through the mesh so that the torn blanket pieces will not clog the protective screen of the emergency coolant recirculating sump.

In a preferred embodiment, a flexible wire mesh septum lies in substantially parallel relationship between two layers of glass fiber wool or ceramic fiber wool. The mesh septum increases the strength of the blanket and aids in cutting up the filler layer as it passes through the septum if torn by a high force liquid stream. A flexible waterproof sheet, consisting of a fine wire mesh screen embedded in silicone rubber, covers the outer surface of the filler layer. A flexible wire mesh casing surrounding the filler layer and waterproof sheet has of from about 40 to about 100 regularly spaced apertures per square inch and is made from stainless steel or Inconel wire having a diameter of from about 0.005 to about 0.015 inches. More preferably, the casing consists of knitted Inconel mesh having about 60 apertures per square inch and made from about 0.011 inch diameter wire.

According to the process of the invention, a thermal insulating blanket is applied to pipes and equipment in the containment building of a nuclear power station. The insulation resists damage if struck by a high force liquid stream during a LOCA and is cut into small pieces which will not clog the protective screens of the emergency coolant sump if torn during a LOCA. The insulating blanket has an inner surface positioned adjacent the pipes and equipment and an opposing outer surface, and consists of a layer of thermal insulating fibers and a wire mesh casing covering at least one surface of the filler layer to form the outer surface of the blanket. The casing dissipates high force liquid streams which strike the outer surface of the blanket and cuts up the filler layer as it passes through the casing if torn by a jet stream.

BRIEF DESCRIPTION OF THE DRAWING

The above and other features, objects and advantages of the present invention will be better understood from a reading of the detailed description of the preferred embodiments in conjunction with the following drawing in which:

FIG. 1 is a perspective and partial sectional view of one embodiment of the insulating blanket of this invention; and FIG. 2 is a cross-sectional view of another embodiment of the blanket of this invention including a wire mesh septum.

DETAILED DESCRIPTION OF THE PREFERRED EMBODIMENTS

Insulating blanket 10 of this invention, as shown in FIGS. 1 and 2, includes a filler layer 11, a waterproof sheet 12 adjacent one surface of the filler layer, and a mesh casing 13 surrounding the composite of filler layer and waterproof sheet. Blanket 10 is shown by way of example only as being a thick substantially rectangular sheet, about 12×12 inches in size and about 2 inches in thickness. Blanket 10 may be fabricated in a variety of different sizes, shapes and thicknesses for wrapping around various shaped pipes and equipment and for maintaining a specified reduction in heat loss.

Filler layer 11 consists of one or more bodies of thermal insulating fibers. Preferably, as shown in FIG. 2, filler layer 11 consists of two thick sheets 20, 21 of glass fiber wool or ceramic fiber wool, and these sheets 20, 21 are separated by a mesh septum 14. Both glass and ceramic fiber wool have a low thermal conductivity and are resistant to chemical attack. The density and insulating value of the filler layer is selected in accordance with the temperature of the system which is to be insulated. Septum 14 lies in substantially parallel relationship between sheets 20 and 21 and divides filler layer 11 substantially in half. Septum 14 is a flexible knitted mesh of metal wire and is designed to enhance the strength of the blanket and to cut sheets 20 and 21 into small pieces if torn by a high force liquid stream.

Waterproof sheet 12 is disposed adjacent one surface of filler layer 11 and is cut to approximately the same size as filler layer 11. Waterproof sheet 12 prevents moisture from getting into filler layer 11 (which reduces the blanket's insulating characteristics) and also increases the strength of blanket 10. Waterproof sheet 12 is preferably made of silicone rubber, and more preferably of a stainless steel wire mesh completely embedded or encapsulated by silicone rubber —such as ERCOSIL 36S sold by Eastern Refractories Company, Inc., Belmont, Mass. Waterproof sheet 12 is completely impervious to moisture and preferably is at least about 25 mils thick, more preferably at least about 45 mils thick. Waterproof sheet 12 is preferably made by calendering a thick paste of silicone rubber over each side of a fine wire mesh screen —to completely fill the apertures of the screen, form integral layers of silicone rubber on each side of the screen, and provide substantially planar opposing surfaces of sheet 12.

The composite of filler layer 11 and waterproof sheet 12 is completely surrounded by or encased within mesh casing 13, with sheet 12 being positioned between the outer surface of the blanket and filler layer 11. Casing 13 is made of metal wire, such as stainless steel or Inconel. The presence of wire mesh casing 13 on the outer surface of the blanket is essential to improving the resistance of the blanket to damage by liquid jet streams. Casing 13 breaks up jet streams which may impinge on the outer surface of the blanket, and thus reduces the force of the streams hitting the underlying layers. In addition, the mesh casing serves to cut up the filler layer into small pieces which will not clog the sump screen if an excessive jet stream tears the waterproof sheet and filler layer.

For purposes of strength, for retaining the filler layer within the casing, and for cutting up the filler layer, if torn, into small pieces which will not clog the sump screen, the mesh casing 13 preferably has of from about 40 to about 100 apertures per square inch, more preferably of from about 48 to about 76 apertures per square inch, and most preferably about 60 apertures per square inch (i.e., 60 density). The wire should have a diameter of from about 0.005 to about 0.015 inches, preferably of from about 0.006 to about 0.011 inches, and more preferably about 0.011 inches. Casing 13 forms a continuous envelope and means 15 are provided for securing the edges of the casing, such as metal clips or hog rings 15, which also pass through waterproof sheet 12. Also, preferably, septum 14 consists of the same wire mesh as casing 13 and the ends of septum 14 are secured by hog rings 15 on opposing sides of the blanket (see FIG. 2). Thus, septum 14 extends along the sides of the outer filler layer sheet 20 and between the outer and inner filler layer sheets 20, 21.

Blanket 10 is intended to be wrapped around a pipe or like equipment with its outer surface (adjacent waterproof sheet 12) facing away from the pipe. Metal pins or lacing anchors 16, secured by locking washers 17, are disposed about the blanket to reinforce the same, preferably, about one every square foot (i.e., at 12 inch centers). Anchor 16 is an integral member consisting of, in spaced relation, a first hook 18, a spindle 19, and a second hook 20. First hook 18 is disposed adjacent the outer surface of the blanket to provide means for attaching the blankets to each other and to the pipes and equipment. Spindle 19 extends transversely through each of filler layer 11, waterproof sheet 12, casing 13, and septum 14. The end of spindle 19 adjacent the inner side of the blanket passes through locking washer 17 and is bent to form flat hook 20.

Illustrative of the invention, a thermal insulating blanket approximately 24×24 inches in size and approximately two inches thick, was constructed having a filler layer of ERCO-MAT F glass fiber wool (sold by Eastern Refractories Company, Inc., Belmont, Mass.). Two one-inch sheets of the glass fiber wool were separated by a septum of Inconel knitted mesh, 60 density, 0.011 inch diameter wire. A waterproof sheet of ERCO-SIL 36S, also sold by Eastern Refractories Company, Inc., having a nominal thickness of about 45 mils, covered the outer surface of the filler layer. A casing of Inconel knitted mesh, 60 density, 0.011 inch diameter wire, surrounded the filler layer and waterproof sheet. The edges of the casing and septum were secured by stainless steel hog rings which also passed through the waterproof sheet. Sixteen stainless steel lacing anchors were spaced about the perimeter of the blanket, with a seventeenth anchor disposed at the center of the blanket. This blanket has withstood a liquid jet stream at a stagnation pressure of 65 psi directed at an angle of 45° , without tearing, for about 20 minutes, in accordance with the test conditions described in Durgin, W. W., and Noreika, J. F., "The Susceptibility Of Fibrous Insulation Pillows To Debris Formation Under Exposure To Energetic Jet Flows," NUREG/CR-3710 (SAND 83-7008), Alden Research Laboratory and Sandia National Laboratory, U.S. Nuclear Regulatory Commission, Washington, D.C. 20555. Further, this blanket gives effective heat insulation at temperatures of from about 200° to about 1,000° F. (93°–538° C.), and can be removed from and reapplied to pipes without loss of integrity. Further, if the filler layer is torn by excessive jet forces during a LOCA, those portions of the filler layer removed by the water during failure come out in a finely chopped condition of less than approximately 0.5 inches in diameter.

Having described the invention in detail, those skilled in the art will appreciate that numerous modifications may be made thereof without departing from the spirit of the invention. Therefore, it is not intended that the scope of the invention be limited to the specific embodiment as illustrated and described herein. Rather, it is intended that the scope of the invention be determined by the appended claims and their equivalents.

What is claimed is:

1. A thermal insulating blanket having an inner surface positionable adjacent an object to be insulated and an opposing outer surface, said blanket being resistant to tearing if a high force liquid stream strikes said outer surface and adapted to be dissipated into small pieces if torn by said stream, said blanket comprising:
    a central filler layer of thermal insulating fibers;
    a solid waterproof sheet covering one surface of said filler layer adjacent the outer surface of said blanket to prevent tearing of said filler layer when a high force liquid stream strikes the outer surface of said blanket;
    a wire mesh casing surrounding said filler layer and waterproof sheet;
    clips spaced about the perimeter of said blanket for securing the edges of said mesh casing together and passing through the edges of said waterproof sheet for retaining said waterproof sheet in position;
    said casing having of from about 40 to about 76 spaced apertures per square inch, said casing being adapted to dissipate high force liquid streams which may strike said outer surface to prevent tearing of said waterproof sheet and filler layer and, in the event said filler layer is torn, said casing serving to cut up said filler layer as it passes through said casing.

2. The blanket of claim 1 wherein said waterproof sheet comprises a solid sheet of silicone rubber.

3. The blanket of claim 2 wherein said waterproof sheet comprises a wire mesh embeddded in silicone rubber.

4. The blanket of claim 1 wherein said wire has a dimaeter of from about 0.005 to about 0.015 inches.

5. The blanket of claim 4 wherein said casing is knitted wire mesh having of from about 48 to about 76 apertures per square inch and said wire is of from about 0.006 to about 0.011 inches in diameter.

6. The blanket of claim 5 wherein said casing has about 48 apertures per square inch and said wire is about 0.011 inches in diameter.

7. The blanket of claim 1 wherein said casing cuts said filler layer into pieces no greater than about 0.5 inches in diameter.

8. The blanket of claim 7 wherein said fibers are selected from the group consisting of glass fibers, ceramic fibers, and combinations thereof.

9. A thermal insulating blanket having an inner surface positionable adjacent an object to be insulated and an opposing outer surface, said blanket being resistant to tearing if a high force liquid stream strikes said outer surface and adapted to be dissipated into small pieces if torn by said stream, said blanket comprising:
    two filler layers of insulating fibers and a wire mesh septum disposed in substantially parallel relationship between said filler layers for increasing the strength of said blanket and for cutting up said filler layers as they pass through said spetum when torn by a high force liquid stream;
    a solid waterproof sheet covering one surface of said filler layers adjacent the outer surface of said blanket to prevent tearing of said filler layer when a high force liquid stream strikes the outer surface of said blanket;
    a wire mesh casing surrounding said filler layers and waterproof sheet;
    clips spaced about the perimeter of said blanket for securing the edges of said mesh casing together and passing through the edges of said waterproof sheet for retaining said waterproof sheet in position;
    said casing being adapted to dissipate high force liquid streams which may strike said outer surface to prevent tearing of said waterproof sheet and filler layers and, in the event said filler layers ared torn, said casing serving to cut up said filler layers as they pass through said casing.

10. The blanket of claim 9, further comprising at least one metal lacing anchor extending through said mesh casing, filler layer and waterproof sheet to further strengthen said blanket.

11. The blanket of claim 9, wherein said wire mesh septum is secured along its edges to said wire mesh casing.

12. The blanket of claim 9 wherein said casing and septum are knitted wire mesh having of from about 40 to about 100 spaced apertures per square inch and said wire has a diameter of from about 0.005 to about 0.015 inches.

13. The blanket of claim 12 wherein said casing and septum have from about 40 to about 60 spaced apertures per square inch.

14. The blanket of claim 13 wherein said wire has a diameter of about 0.011 inches.

15. A thermal insulating blanket having an inner surface positionable adjacent an object to be insulated and an opposing outer surface, said blanket being resistant to tearing if a high force liquid stream strikes said outer surface and adapted to be dissipated into small piece if torn by said stream, said blanket comprising:
a flexible central filler layer of thermal insulating fibers selected from the group consisting of glass fiber wool, ceramic fiber wool, and combinations thereof;
a flexible waterproof solid sheet comprising a wire mesh embedded in silicone rubber, said sheet covering one surface of said filler layer adjacent the outer surface of said blanket to prevent tearing of said filler layer when a high force liquid stream strikes the outer surface of said blanket;
a flexible knitted wire mesh casing surrounding said filler layer and waterproof sheet;
metal clips spaced about the perimeter of said blanket for securing the edges of said mesh casing together and passing through the edges of said waterproof sheet for retaining said waterproof sheet in position;
said casing having of from about 48 to about 76 spaced aperture per square inch and said wire being of from about 0.005 to about 0.015 inches in diameter such that said casing is adapted to dissipate high force liquid streams which may strike said outer surface and to cut up said filler layer as it passes through said apertures if said filler layer is torn by a high force liquid stream.

16. The blanket of claim 15 wherein said casing has about 48 to about 60 apertures per square inch and said wire is about 0.011 inches in diameter and is made from a metal selected from the group consisting of stainless stell and Inconel.

17. The blanket of claim 16 wherein said metal is Inconel.

18. A process for thermally insulating pipes and equipemnt in the containment building of a nuclear power station with insulation which resists damage if stuck by a high-force liquid stream during a loss of coolant accident and which if torn is dissipated into small pieces which will not clog the circulating pump, said process comprising the step of applying to the pipes and equipment insulating blankets, each of said blankes having an inner surface positioned adjacent the pipes and equipment and an opposing outer surface, each of said blankets comprising a filler layer of thermal insulating fibers and a wire mesh casing covering at least one surface of said filler layer to form said outer surface of said blanket, said casing being adapted to dissipate high force liquid streams which may strike said outer surface of said blanket and to cut up said filler layer as it passes through said casing into small pieces which will not clog a circulating pump if said filler layer is torn by a high force liquid stream.

19. The process of claim 18 further including a waterproof sheet positioned between said filler layer and said outer surface.

20. The process of claim 19 wherein said mesh casing forms a continuous envelope having edges attached by clips which also pass through said waterproof sheet.

21. The process of claim 20 wherein said casing comprises knitted mesh having of from about 40 to about 100 spaced apertures per squares inch and said wire has a diameter of from about 0.005 to about 0.015 inches.

22. The process of claim 21 wherein said casing comprises knitted mesh having of from about 48 to about 76 spaced apertures per square inch and said wire has a diameter of from about 0.006 to about 0.011 inches.

23. The process of claim 20 wherein said waterproof sheet comprises a wire mesh embedded in silicone rubber and said casing comprises Inconel knitted mesh of about 0.011 inch diameter wire and having about 40 to about 60 apertures per square inch.

* * * * *

UNITED STATES PATENT AND TRADEMARK OFFICE
CERTIFICATE OF CORRECTION

PATENT NO. : 4,676,946

DATED : June 30, 1987

INVENTOR(S) : David S. Feinzig

It is certified that error appears in the above-identified patent and that said Letters Patent is hereby corrected as shown below:

In the Abstract, line 15, "spetum" should read -- septum --.

Column 6, line 48, "spetum" should read -- septum --.

Signed and Sealed this

Twenty-seventh Day of October, 1987

Attest:

DONALD J. QUIGG

*Attesting Officer*  *Commissioner of Patents and Trademarks*